US007162208B2

(12) United States Patent
Hendricksen

(10) Patent No.: US 7,162,208 B2
(45) Date of Patent: Jan. 9, 2007

(54) FIXED SETTING AM/FM RADIO SYSTEM FOR BROADCAST PROMOTION

(76) Inventor: Mark W. Hendricksen, 10805 E. 22nd Ave., Spokane, WA (US) 99206

( * ) Notice: Subject to any disclaimer, the term of this patent is extended or adjusted under 35 U.S.C. 154(b) by 392 days.

(21) Appl. No.: 09/935,475

(22) Filed: Aug. 22, 2001

(65) Prior Publication Data

US 2003/0040271 A1 Feb. 27, 2003

(51) Int. Cl.
*H04B 1/38* (2006.01)

(52) U.S. Cl. .................. 455/90.2; 455/419; 455/161.2; 455/3.01

(58) Field of Classification Search ............. 455/158.5, 455/161.2, 186.2, 161.1, 344, 11.1, 3.02, 455/457, 145, 456.1, 456.6, 98, 3.06, 419, 455/3.05, 414.2, 90.2, 66.1, 517, 3.03, 186.1, 455/185.1, 902, 166.2, 184.1, 181.1, 347, 455/3.01, 575.8, 550.1, 3.04, 182.3, 183.2, 455/179.1

See application file for complete search history.

(56) References Cited

U.S. PATENT DOCUMENTS 5,513,384 A * 4/1996 Brennan et al. ............ 455/517
5,600,730 A * 2/1997 Kenning et al. ........... 455/66.1
5,732,338 A * 3/1998 Schwob ................... 455/158.5
6,011,854 A * 1/2000 Van Ryzin ............... 455/161.1
6,023,616 A * 2/2000 Briskman ................... 455/344
6,112,064 A * 8/2000 Arrowsmith et al. .... 455/186.1
6,697,607 B1 * 2/2004 Smith et al. ............. 455/185.1
6,697,631 B1 * 2/2004 Okamoto .................... 455/457
6,728,518 B1 * 4/2004 Scrivens et al. ........... 455/90.2

OTHER PUBLICATIONS

Exemplary Miniature/Micro Radios—Frequency Adjustable.

* cited by examiner

*Primary Examiner*—Lana Le
*Assistant Examiner*—John J. Lee

(57) ABSTRACT

A radio apparatus including an outer encasement, a radio signal receiver secured relative to the outer encasement and configured to receive at least one of AM and FM radio signals, an audio output operatively connected to the radio signal receiver, and wherein the audio output may be limited to a predetermined radio signal frequency representing broadcast services of a radio station. The invention further includes a method of promoting radio broadcast services, comprising providing a radio apparatus which includes an audio output, an encasement with at least one promotional element thereon, setting the radio apparatus to provide audio output only for a predetermined radio broadcast frequency related to a source of the radio broadcast services being promoted; and distributing the radio apparatus to one of existing and prospective listeners of the source of the radio broadcast services being promoted, thereby promoting the broadcast services.

37 Claims, 10 Drawing Sheets

FIXED SETTING AM/FM RADIO SYSTEM FOR BROADCAST PROMOTION

TECHNICAL FIELD

This invention generally pertains to an AM/FM radio system which is set or fixed to a pre-determined radio station or frequency so that the listener may not change to listen to channels or stations other than the pre-determined broadcast service(s) such as radio channel(s), frequencies or radio station(s), and a promotional method utilizing such a radio apparatus.

BACKGROUND OF THE INVENTION

Radios, including miniature radios, have been known for many years. Radios are typically provided with tuners which the user may adjust to receive and play a particular radio station or frequency. The tuners may be electronic, digital, analog or other. Some smaller radios provide a push button seek function to receive any one of a number of different stations.

Radio stations and programs typically promote their broadcast services, stations, channels and/or programs, both alone and in conjunction with the promotion of other in-house and third party products and services. In many such promotions, items are given away and/or sold which bear indicia or promotional material relating to the broadcast services, stations, channels and/or programs.

In some cases for instance, broadcast services, stations, channels and/or programs are promoted by broadcasting live from another business such as a car dealer or a sports bar, thereby promoting both the radio station/program and the other business(es).

There is a need for an apparatus and/or system in which at least one of the promotional items given away or sold is a radio which is or can only be tuned to the broadcast service(s), radio station(s) and/or channel(s) which are being promoted or related to the promotions. It is an object of this invention to provide such an apparatus and/or system.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

There are Amplitude Modulation (AM) systems, which are well known and are generally in the bandwidth from about 680,000 hertz (cycles per second) to about 1,040,000 hertz. In a typical AM radio, the waves are modulated so that the amplitude or energy level of the carrier wave varies at the same frequency as the changing voltage in the sound signal. There are Frequency Modulation (FM) systems in the general range of 100,000,000 hertz (for example 101.5 on the FM dial is a transmitter generating a sine wave in the general range of 101,500,000 cycles per second). In a typical FM radio, the waves are modulated so that the frequency of the carrier wave varies with the voltage level of the sound signal.

Radios have been well known for years, including miniature radios. A typical AM radio may include an antenna, a tuner, a detector (demodulator), an amplifier and an audio output device such as a speaker or ear phones. The tuner typically is set to receive a sine wave of only one frequency, ignoring the other frequencies. In a typical FM radio, the detector may be different, turning changes in frequency into sound.

When the term operatively connected is used, such as when the audio output device is operatively connected to the radio signal receiver, this is not limited to a direct connection, but instead is broader than this. This term instead is used for direct and indirect (such as through modulator, an amplifier and other known components) operative connection, so long as one or more of the radio signals received are converted to the desired or pre-determined audio output allowing the user to listen to the radio station, channel, program or broadcast.

A radio apparatus which may be utilized as part of this invention may be a radio apparatus which receives AM and/or FM radio signals.

Figure 1:
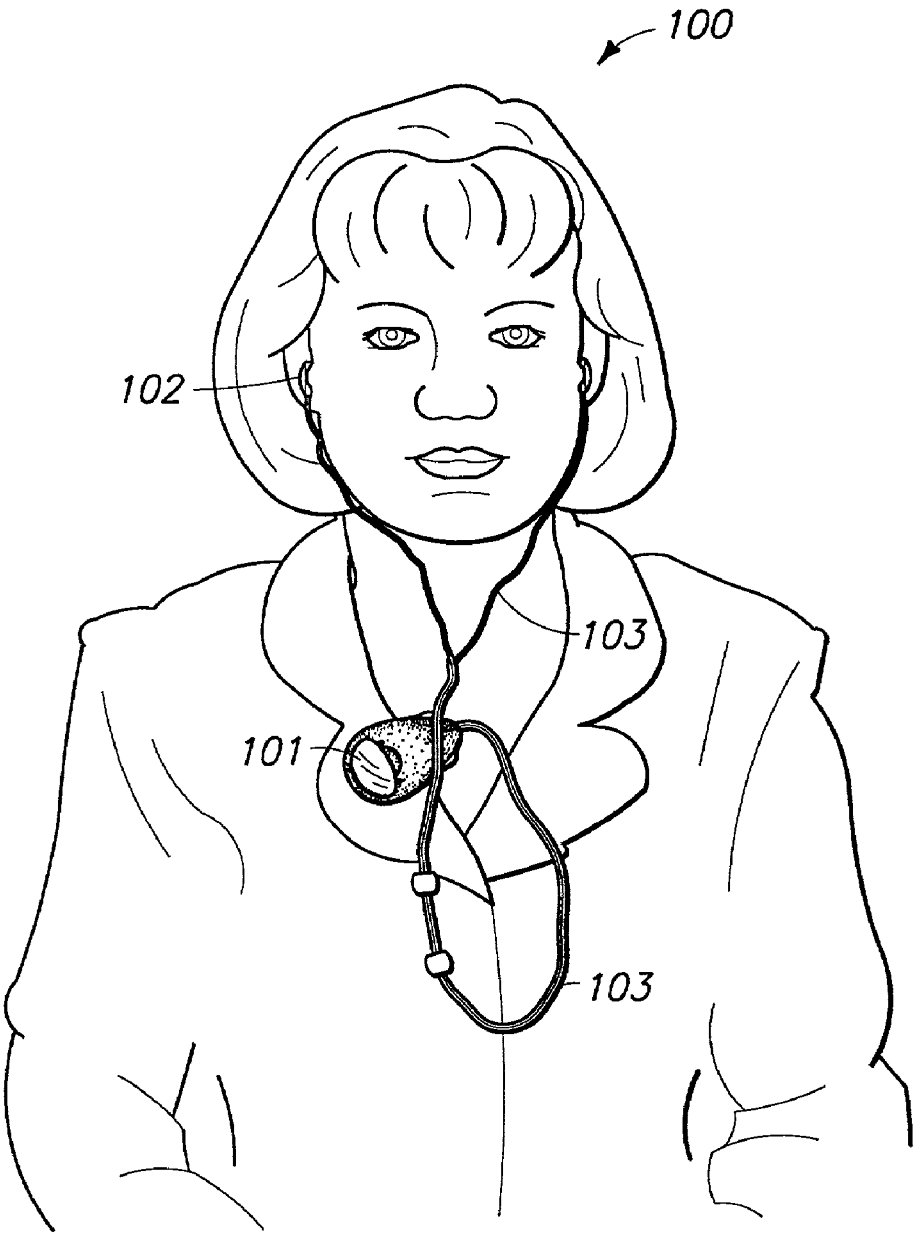
FIG. 1 is a an elevation view of a person listening to a radio apparatus which may be used as part of the system contemplated by this invention.

FIG. 1 shows a person 100, who would be: an existing or prospective listener to the broadcast services of a particular radio station; an existing or prospective customer of the third party advertiser; or both. FIG. 1 illustrates the person 100, the radio 101 (which in the example shown, is a miniature radio), which in the example shown discloses a pair of ear inserts 102 with cords 103 connecting the ear inserts 102 to the radio. In alternative embodiments, the radio would include a speaker.

The radio apparatus in FIG. 1 may be a small, miniature and/or micro radio, such as preferably less than three or four inches in length in any direction (or smaller), although the invention is not so limited.

Figure 2:
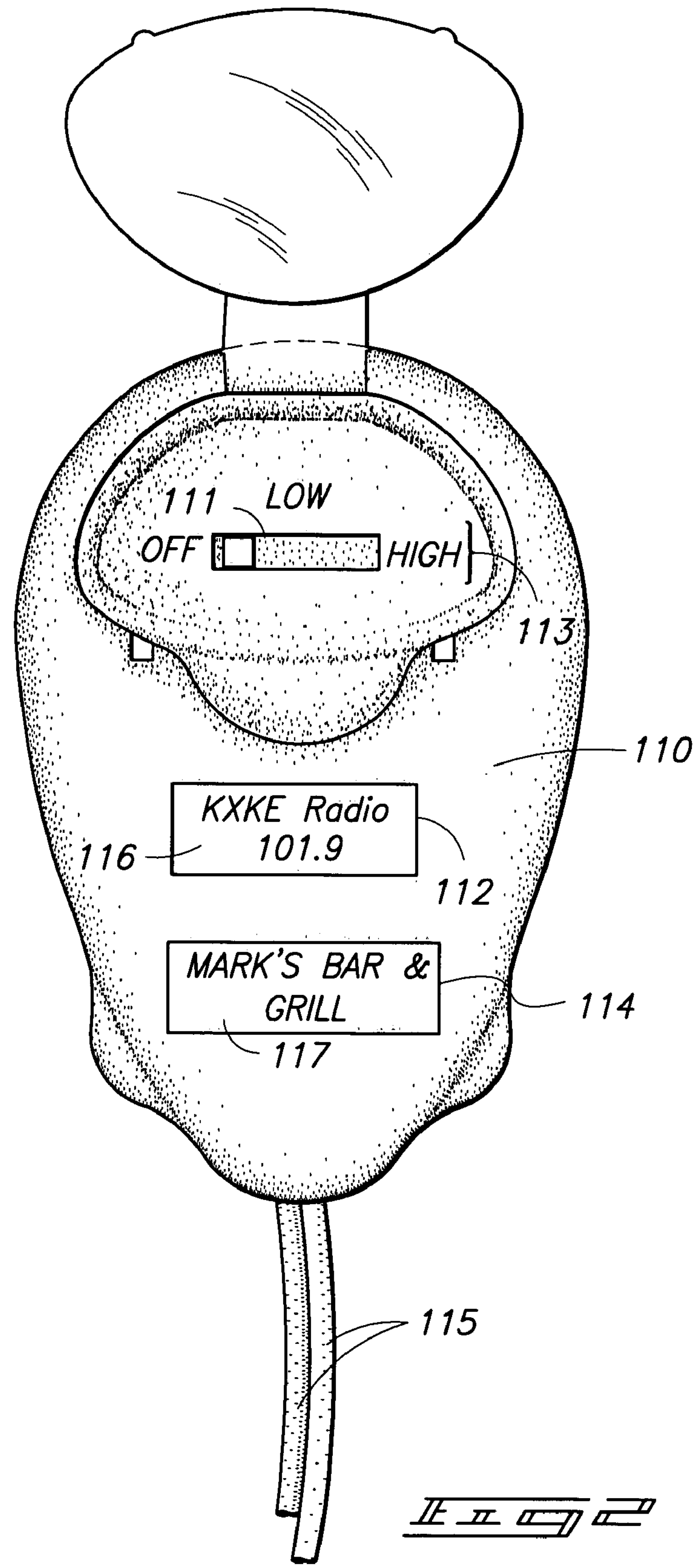
FIG. 2 is a front elevation view of one embodiment of a radio apparatus which may be utilized as contemplated by this invention.

FIG. 2 shows one embodiment of a radio apparatus 110 which may be utilized as contemplated by this invention, illustrating outer encasement 113, the on/off switch 111, a first media area 112 with an broadcast services identifier 116 therein, and a second media area 114 with a non-broadcast goods or services (i.e. a non-broadcast advertiser) identifier 117 therein. Cords 115 are merely known insulated electrical wires which provide electrical connection between the radio apparatus 110 and ear inserts (not shown in FIG. 2).

Figure 8:
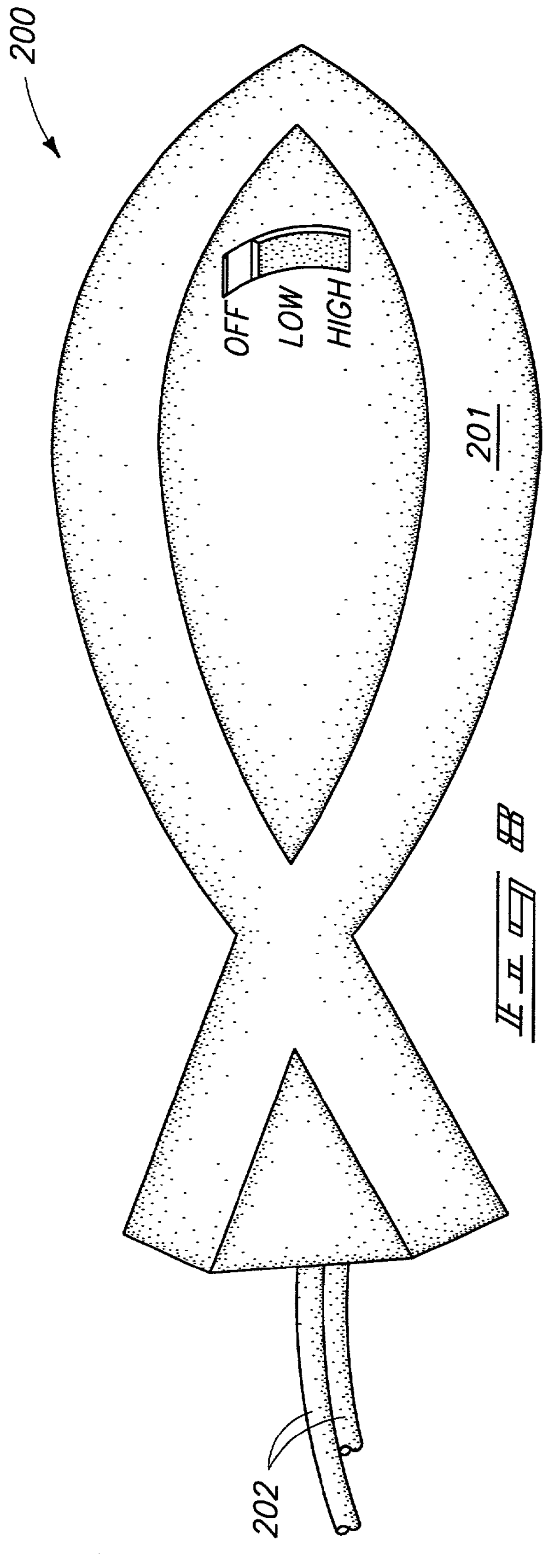
FIG. 8 is an elevation view of another example of an embodiment of a radio system, one which may be used to promote one or more Christian based radio stations or channels.

It will be appreciated by those of ordinary skill in the art that either of the broadcast services identifier 116 or the non-broadcast services identifier 117 may be placed in media areas for advertising and promotion, or both as shown. It will further be appreciated by those of ordinary skill in the art that the outer encasement 113 may be uniquely shaped to provide a promotional identifier either for the source of the broadcast services or for the source of the non-broadcast services. An example of such is shown in FIG. 8, as described more fully below.

From a commercial flexibility perspective for some embodiments of this invention, it would likely be preferable to manufacture the radio apparatus so that it may later be fixed on a particular station or channel, such as by a broadcast service manager, owner or promoter. A promoter for instance may set and fix the channel or station setting after the radio is manufactured, but before it is given and/or sold pursuant to the promotion. This would allow better flexibility in some embodiments of the invention to allow a more generally manufactured radio to be affiliated with promotional identifier and fixed to one or more pre-determined stations.

The radio may be set from controls which are not readily or normally accessible to the user, such as within the outer encasement. Once the outer encasement is then closed, the station setting is fixed and may not be altered without disassembling the radio. The frequency setting could also be made such that there is no later ability to disassemble the outer casing or other protective casing and reset the radio frequency, such that the frequency may be set with another tool or without a dial or readily usable tuner. In such an embodiment, a user of the radio may not change the station or frequency setting even if the radio is disassembled.

Figure 3:
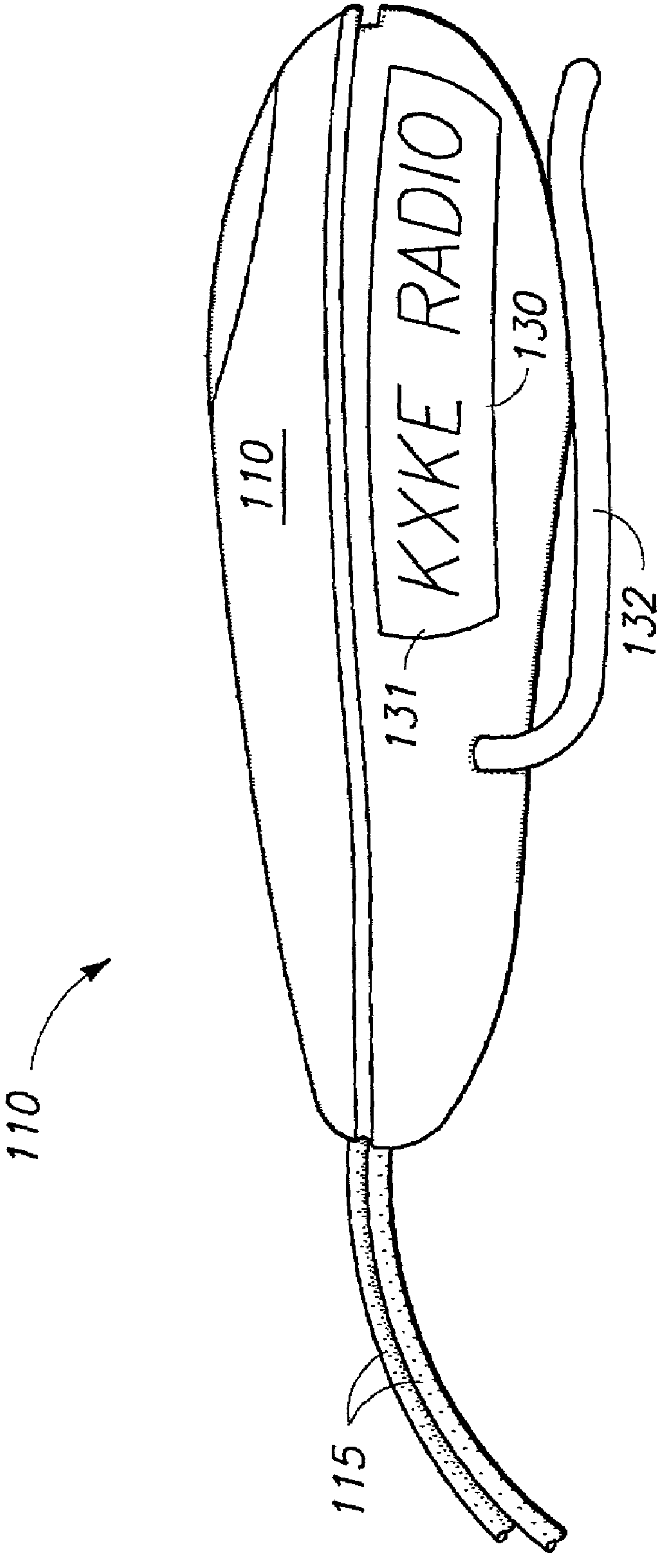
FIG. 3 is a side view the embodiment of the radio apparatus illustrated in FIG. 2.

FIG. 3 is a side view of one example of a radio apparatus 110 which may be used as part of the systems contemplated by this invention, showing a third media area 130 with a promotional broadcast service identifier 131 therein. FIG. 3 further shows cords 115, outer encasement 113, and clip 132 which may by used to clip or removably attach the radio apparatus 110 to articles of clothing or any other item to which it is desired to attach the radio apparatus 110.

Figure 4:
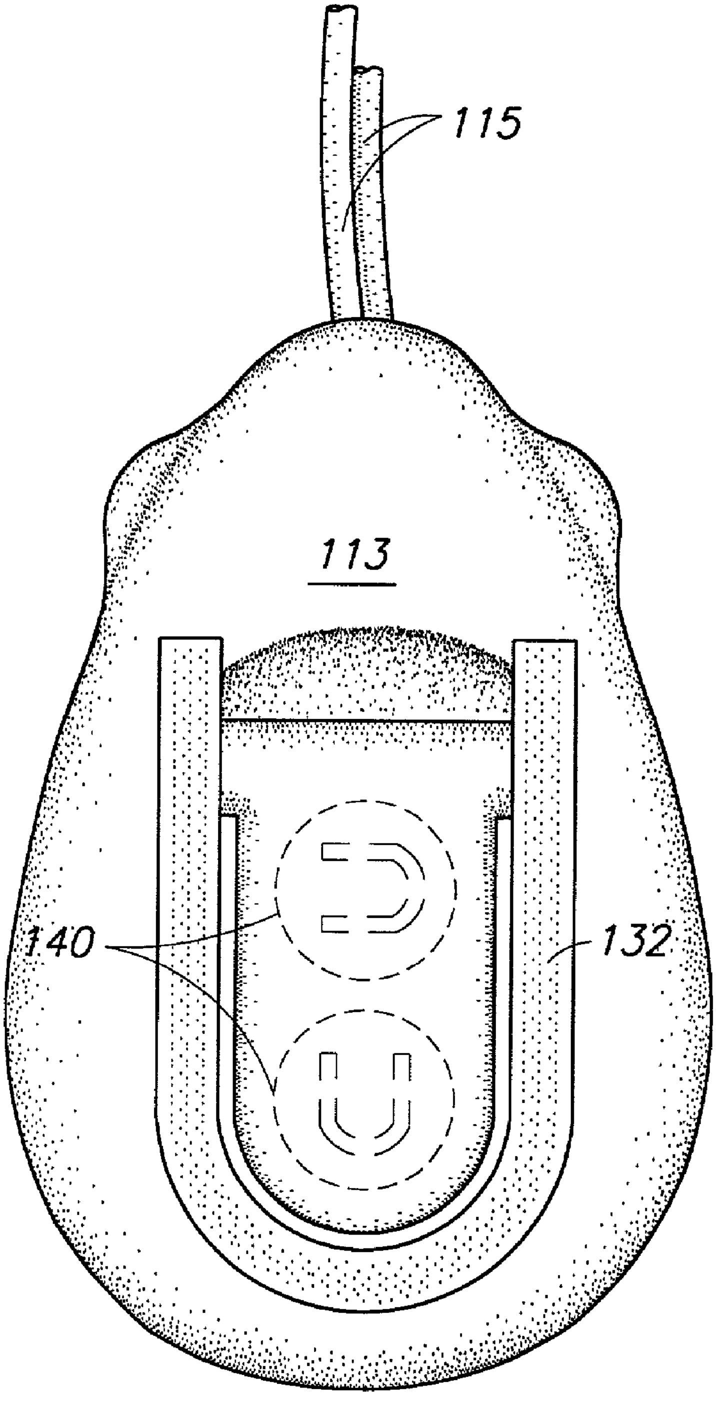
FIG. 4 is a rear elevation view of the embodiment of the radio apparatus illustrated in FIG. 3.

FIG. 4 is a rear elevation view of the embodiment of the radio apparatus 110 illustrated in FIG. 3, showing outer encasement 113, cords 115, attachment clip 132 and two button type battery apertures 140.

Figure 5:
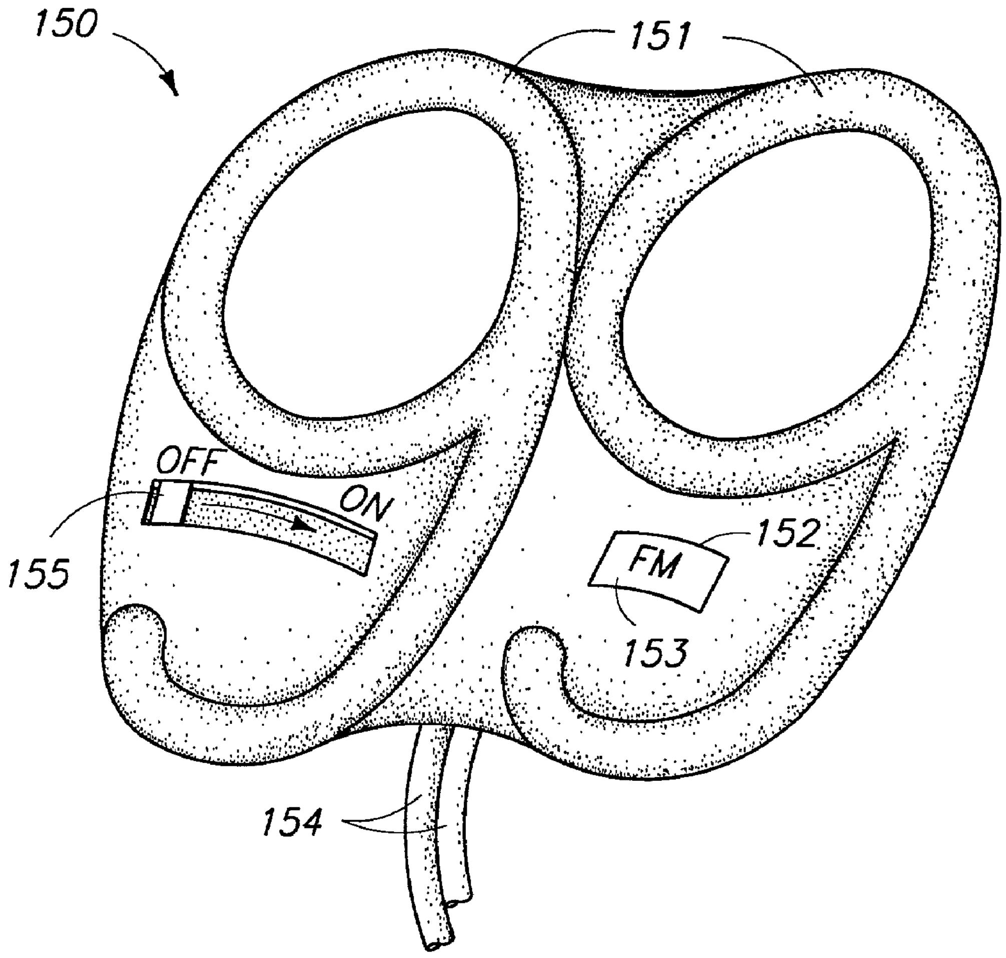
FIG. 5 is a front elevation view of an example of a radio apparatus in which the outer encasement itself provides or partially defines a promotional broadcast service identifier.

FIG. 5 illustrates one example of a radio apparatus 150 in which the outer encasement itself provides or partially defines a promotional broadcast service identifier 151, in this example, the number "99", which indicates where the listener would normally tune their dial if this radio were not fixed to that designation. A media area 152 is also provided which in this case allows the source of the broadcast services to convey that the call letters refer to an FM 153 station. FIG. 5 further illustrates an on/off switch mechanism 155 and audio output cords 154.

Figure 6:
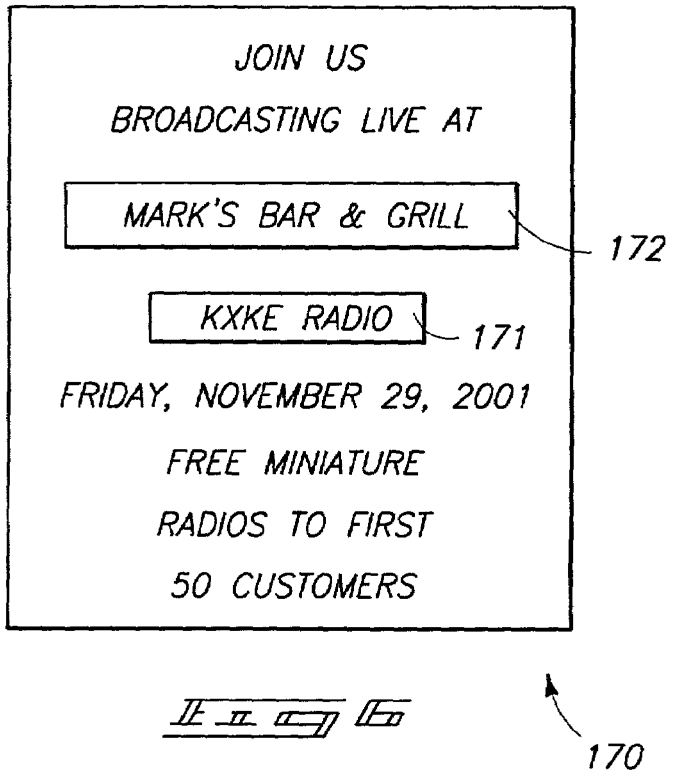
FIG. 6 is an elevation view of one example of a promotional piece which may be utilized in a system contemplated by this invention, showing an exemplary flyer, brochure, and/or advertisement.

FIG. 6 shows an exemplary promotional piece 170, which may be a flyer, a brochure, an advertisement, or any one of a number of other forms of advertising or promotion. In this case the promotional piece 170 illustrates one embodiment or method of utilizing the station specific radio apparatus to jointly promote the broadcast services 171 and the non-broadcast services 172.

In the promotional method shown in FIG. 6, either or both of the advertisers/promoters (i.e. for the broadcast services and the non-broadcast services), may pay for the radio apparatuses and/or the promotional piece and then give the radios away, or they may sell the radios, all within the contemplation of this invention.

Figure 7:
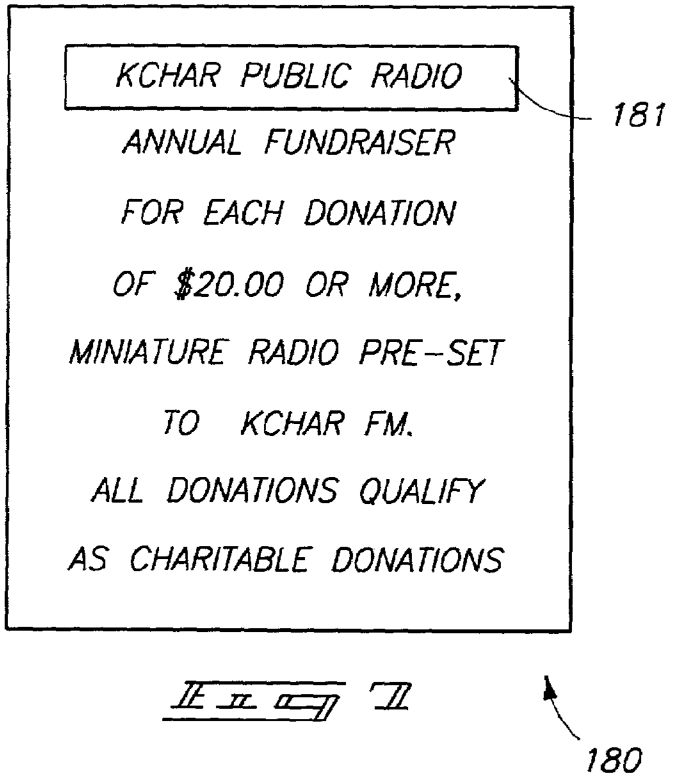
FIG. 7 is an elevation view of another example of a promotional piece for a different type of broadcast service promotional event.

FIG. 7 illustrates another exemplary promotional piece 180, of another type of promotion of the station specific or fixed setting radio apparatus. FIG. 7 shows an example of how the source of the broadcast services 181 may use the radios in fund raising efforts, which would be preferably applicable for broadcast services fully or partially supported by listener donations. The promotional piece 180 in FIG. 7 conveys that the radio apparatus is preset to the broadcast services being promoted.

There are examples of other types of promotions which may be accomplished in connection with this invention. For instance there are numerous charitable or non-profit broadcast services, stations, channels and/or programs which depend on donations and/or contributions for funding. In fund raising, many of these charities give away gift items in exchange for contributions and/or donations, some gifts related to the amount of the donation/contribution. Examples may be public radio stations and/or Christian radio stations.

FIG. 8 illustrates one example of a radio apparatus/system which may be used as contemplated by this invention, showing the outer encasement of a radio apparatus shaped as a recognized Christian symbol. Utilizing this shape combined with the radio apparatus only allowing the user to tune in or listen to one or more pre-determined stations/channels, is a promotional apparatus and system contemplated by this invention.

FIG. 8 illustrates radio apparatus, outer encasement 201 and cords 203, the outer encasement 201 including the Christian symbol by being shaped appropriately or having other indicia on or part of the outer encasement 201. Another example is one wherein the outer encasement defines a promotional indicia of a sports team, and the radio apparatus is set or fixed to output broadcast services which broadcast the games for instance.

Another example may be a sports accessory company such as Nike or Oakley part of promotions relative to a sports team or individual which uses their products, providing a radio apparatus for gift and/or sale which is fixed or pre-tuned to a radio frequency related to broadcast services which are part of the promotions.

Figure 9:
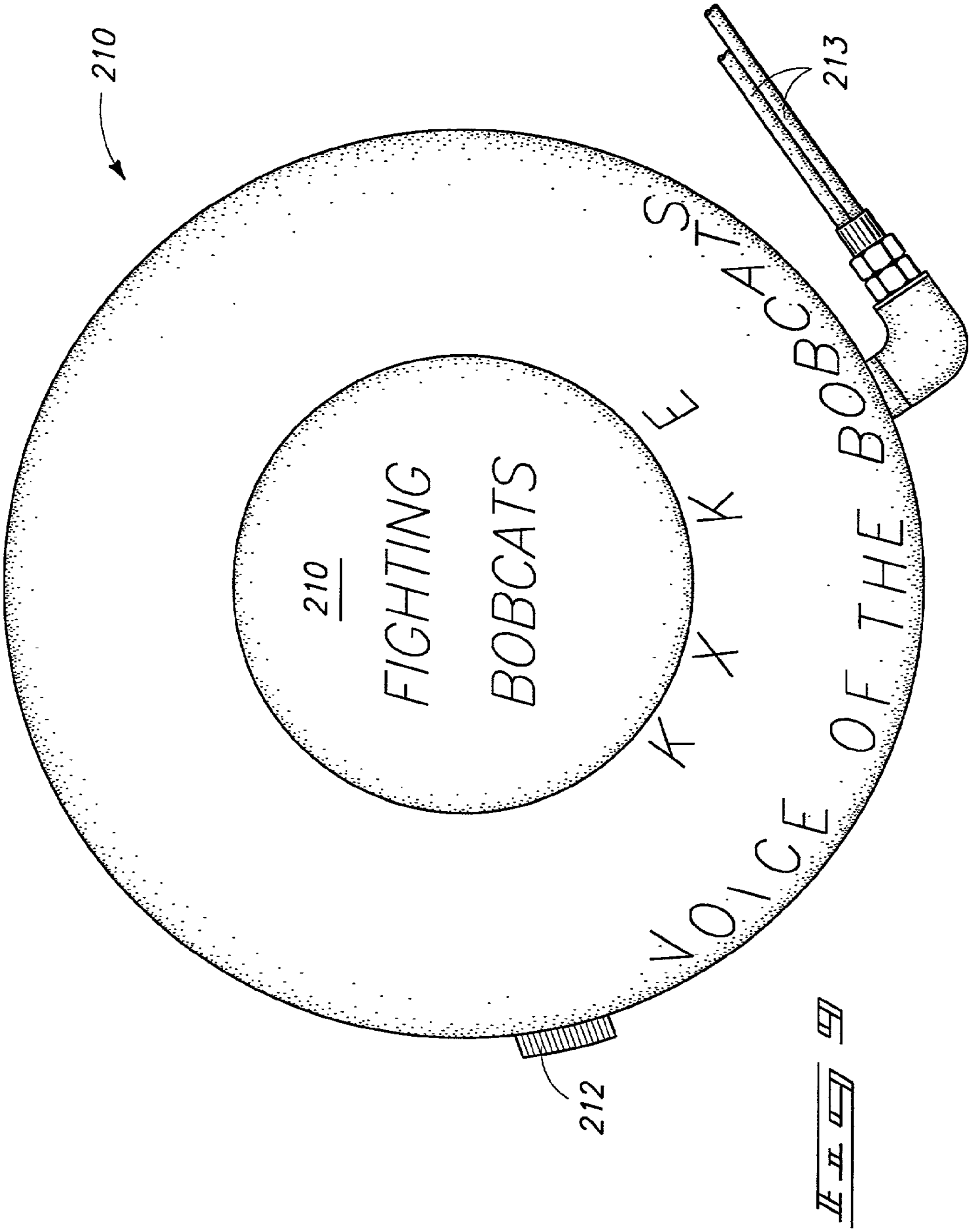
FIG. 9 is an elevation view of another example of an embodiment of a radio system, one which may be used to promote one or more broadcast radio stations or channels related to a sports team.

FIG. 9 is an elevation view of another example of an embodiment of a radio system, one which may be used to promote one or more broadcast radio stations or channels related to a sports team. FIG. 9 illustrates multiple media areas on an outer encasement 210, volume control 212, and a headset cord 213 (an audio output device). This embodiment is preferably utilized in situations in which it is desired to promote the listening to broadcasts of games being played by the sports team. The radios may be given away or sold and identify the broadcast services as "the" voice of the team, such as "The Voice of the Bobcats".

Figure 10:
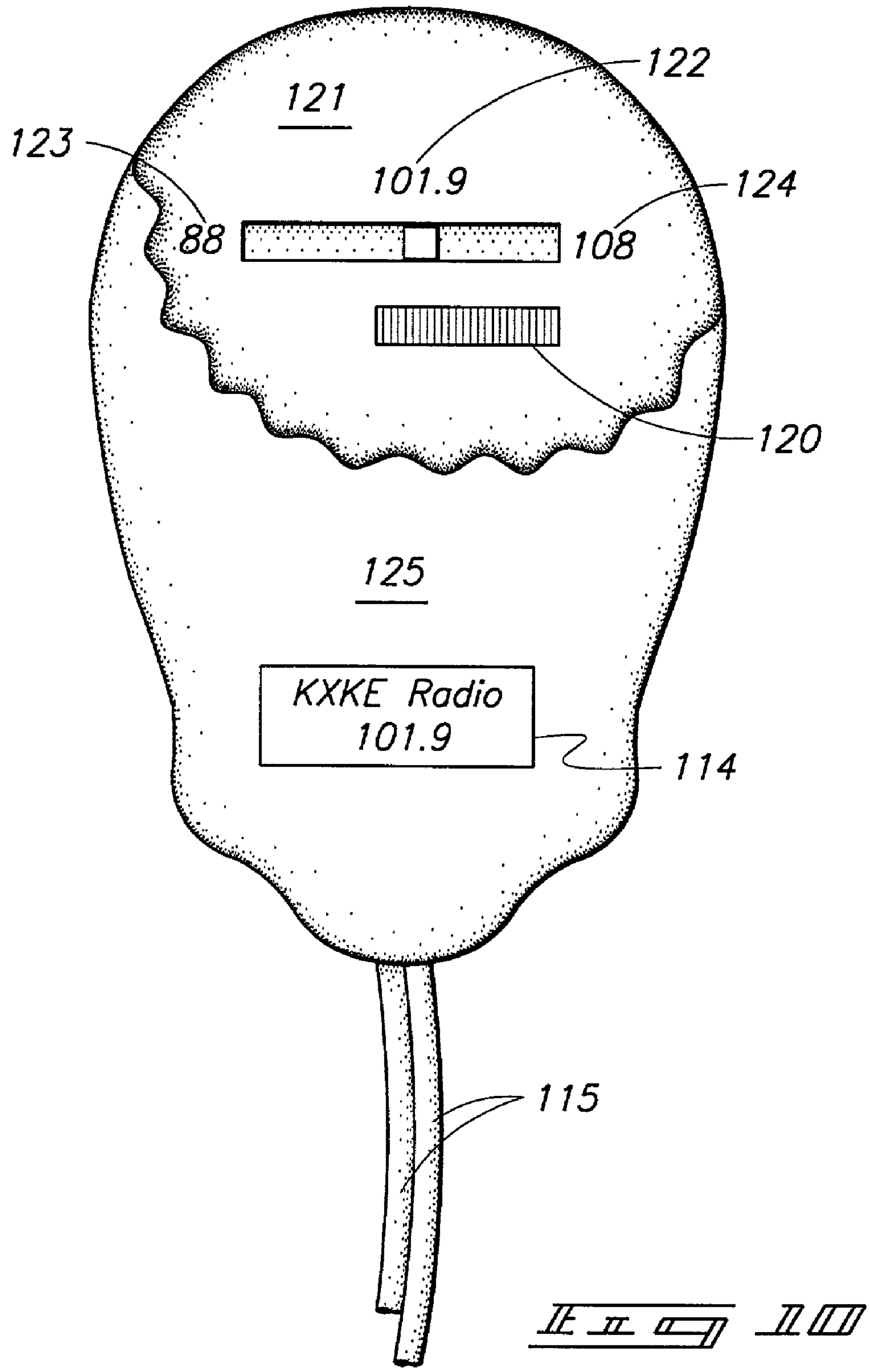
FIG. 10 is a front break-away elevation view of the embodiment of the radio apparatus illustrated in FIG. 2, showing a tuner secured within the outer encasement.

FIG. 10 is a front break-away elevation view of the embodiment of the radio apparatus illustrated in FIG. 2, showing media area 114 (for placement of a promotional identifier), a tuning dial 120 or tuner mounted on board 121 within outer encasement 125. The tuning dial 120 has been used to set or fix the broadcast frequency or station to 101.9 as depicted by item 122. The radio apparatus shown is for an FM radio with the range of frequencies or stations being from a low range 123 of approximately 88 on the dial to a high range end 124 of about 108.

In this embodiment of the invention, the tuning dial 120 is secured within the outer encasement 125 so that it may be initially set or fixed on a broadcast service, and then the outer encasement 125 may be secured or closed around it so that the frequency may not later be readily changed. The outer encasement 125 may for instance be glued or fastened together once the tuner has been set to the pre-determined frequency, to fix the radio to the promoted broadcast service(s). While an analog type dial is shown in FIG. 10, the invention is not limited to such and any one of a number of different ways may be used to fix or pre-set the radio to the pre-determined frequency, such as without limitation, digital settings, lockable or fixable seek type buttons, latches on the outer encasement 125, and others. The radio may also be preset to one frequency during manufacturing and assembly with no later ability to change or alter it, which may be preferable for larger volume promotions.

By pre-setting or enclosing the tuning dial 120 within the outer encasement 125, the audio output of the radio may be limited to a predetermined radio signal frequency representing the broadcast services being promoted.

Figure 11:
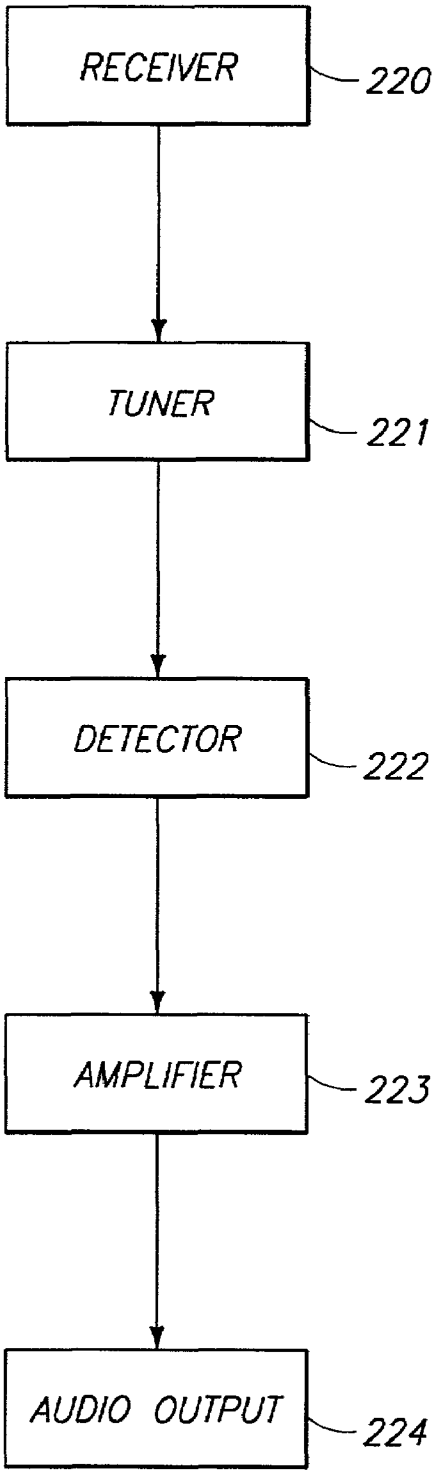
FIG. 11 is a schematic depiction in block diagram format of some components of a radio apparatus which may be utilized within the contemplation of this invention.

FIG. 11 is a schematic depiction in block diagram format of some components of a radio apparatus which may be utilized within the contemplation of this invention, including receiver 220 (which may be an antenna), tuner 221, detector 222 (may be a demodulator), amplifier 223 and audio output device 224 (which may for example be a speaker, ear pieces, or headset). The components of radio apparatuses are known by those of ordinary skill in the art and will not therefore be discussed in any further detail.

It will also be appreciated by those of ordinary skill in the art that the placement of mechanical, electronic, or other physical locking members on standard radios may be utilized within the contemplation of this invention. A barrier may also be used as a lock to prevent the radio from being re-tuned to a different station or different broadcast services.

As will be appreciated by those of reasonable skill in the art, there are numerous embodiments to this invention, and variations of elements and components which may be used, all within the scope of this invention.

One embodiment of this invention for example is a radio apparatus comprising: an outer encasement; a radio signal receiver secured relative to the outer encasement and configured to receive at least one of AM and FM radio signals; an audio output device operatively connected to the radio signal receiver; and wherein the audio output may be limited to a predetermined radio signal frequency representing broadcast services of a radio station. There are further embodiments to this, such as: wherein the outer encasement defines a promotional identifier of one of broadcast services and non-broadcast services; wherein a promotional identifier of one of broadcast services and non-broadcast services is operatively attached to the outer encasement; wherein the outer encasement defines a promotional identifier of one of broadcast services and non-broadcast services and further includes a promotional identifier of the other of broadcast services and non-broadcast services; wherein the radio signal receiver is configured to only receive the broadcast signal of a pre-determined frequency, representing broadcast services of the radio station; and wherein the radio signal receiver is configured to multiple broadcast signals of different frequencies, and the audio output is configured to only output radio signals received of the pre-determined frequency, representing broadcast services of the radio station. Still further, the audio output may be set to only output radio signals received of the pre-determined frequency through a mechanical setting of the audio output to the predetermined radio station, or through an electronic setting of the audio output to the predetermined radio station.

In another embodiment, a radio apparatus is provided which comprises: an outer encasement; an antenna secured relative to the outer encasement; a tuner operatively connected to the antenna to receive one of a pre-determined AM and FM radio signal from the antenna; a demodulator disposed to receive the radio signal from the antenna; an amplifier operatively connected to the demodulator to receive the radio signal from the demodulator and to create an amplified radio signal; and an audio output device operatively connected to the amplifier to receive the amplified radio signal from the demodulator. There are further embodiments to this, such as: wherein the audio output represents the broadcast services of one radio station; wherein the demodulator is a diode; wherein the radio apparatus is miniature; wherein the outer encasement defines a promotional identifier of one of broadcast services and non-broadcast services; wherein a promotional identifier of one of broadcast services and non-broadcast services is operatively attached to the outer encasement; and/or wherein the outer encasement defines a promotional identifier of one of broadcast services and non-broadcast services and further includes a promotional identifier of the other of broadcast services and non-broadcast services.

In another embodiment, a radio apparatus is provided which comprises: an outer encasement; an antenna secured relative to the outer encasement; a tuner operatively connected to the antenna to receive one of a pre-determined AM and FM radio signal from the antenna; a demodulator disposed to receive the radio signal from the antenna; an amplifier operatively connected to the demodulator to receive the radio signal from the demodulator and to create an amplified radio signal; and an audio output operatively connected to the amplifier to receive the amplified radio signal from the demodulator. There are further embodiments to this, such as: wherein the audio output represents the broadcast services of one radio station; wherein the demodulator is a diode; wherein the radio apparatus is miniature; wherein the outer encasement defines a promotional identifier of one of broadcast services and non-broadcast services; wherein a promotional identifier of one of broadcast services and non-broadcast services is operatively attached to the outer encasement; and/or wherein the outer encasement defines a promotional identifier of one of broadcast services and non-broadcast services and further includes a promotional identifier of the other of broadcast services and non-broadcast services.

In another embodiment of the invention, a radio apparatus may be provided which comprises: an outer encasement; a radio signal receiver secured relative to the outer encasement and configured to receive at least one of AM and FM radio signals; an audio output device operatively connected to the radio signal receiver; and wherein a frequency tuner is located in the outer encasement such that once the tuner is set to a pre-determined radio signal frequency representing broadcast services of a radio station and the outer encasement closed, the tuner is not normally accessible by a user of the radio apparatus. Further embodiments to this embodiment may be: wherein the outer encasement defines a promotional identifier of one of broadcast services and non-broadcast services; wherein a promotional identifier of one of broadcast services and non-broadcast services is operatively attached to the outer encasement; wherein the outer encasement defines a promotional identifier of one of broadcast services and non-broadcast services and further includes a promotional identifier of the other of broadcast services and non-broadcast services; wherein the radio signal receiver is configured to only receive the broadcast signal of a pre-determined frequency, representing broadcast services of the radio station; and/or wherein the radio signal receiver is configured to multiple broadcast signals of different frequencies, and the audio output is configured to only output radio signals received of the pre-determined frequency, representing broadcast services of the radio station. Further embodiments to this may be wherein the audio output is set to only output radio signals received of the pre-determined frequency through a mechanical setting of the audio output to the predetermined radio station; and/or wherein the audio output is set to only output radio signals received of the pre-determined frequency through an electronic setting of the audio output to the predetermined radio station.

In another embodiment of the invention, a radio apparatus may be provided which comprises: an outer encasement; a radio signal receiver secured relative to the outer encasement and configured to receive at least one of AM and FM radio signals; an audio output operatively connected to the radio signal receiver; and wherein a frequency tuner is located in the outer encasement such that once the tuner is set to a pre-determined radio signal frequency representing broadcast services of a radio station and the outer encasement closed, the tuner is not normally accessible by a user of the radio apparatus. Further embodiments to this embodiment may be: wherein the outer encasement defines a promotional identifier of one of broadcast services and non-broadcast services; wherein a promotional identifier of one of broadcast services and non-broadcast services is operatively attached to the outer encasement; wherein the outer encasement defines a promotional identifier of one of broadcast services and non-broadcast services and further includes a promotional identifier of the other of broadcast services and non-broadcast services; wherein the radio signal receiver is configured to only receive the broadcast signal of a pre-determined frequency, representing broadcast services of the radio station; and/or wherein the radio signal receiver is configured to multiple broadcast signals of different frequencies, and the audio output is configured to only output radio signals received of the pre-determined frequency, representing broadcast services of the radio station. Further embodiments to this may be wherein the audio output is set to only output radio signals received of the pre-determined frequency through a mechanical setting of the audio output to the predetermined radio station; and/or wherein the audio output is set to only output radio signals received of the pre-determined frequency through an electronic setting of the audio output to the predetermined radio station.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A radio apparatus comprising:

an outer encasement;

a multi-frequency radio signal receiver secured relative to the outer encasement, the radio signal receiver being capable of receiving a plurality of frequencies of radio signals and configured to receive at least one radio signal;

an audio output device operatively connected to the radio signal receiver;

wherein the radio signal receiver is limited to receive only one predetermined radio signal frequency representing broadcast services of a single radio station thereby limiting the audio output to play only the broadcast services of the single radio station; and further wherein the radio apparatus includes a promotional identifier of one of broadcast services and a non-broadcast advertiser.

2. A radio apparatus as recited in claim 1, and further wherein the outer encasement defines the promotional identifier of one of broadcast services and a non-broadcast advertiser.

3. A radio apparatus as recited in claim 1, and further wherein the promotional identifier of one of broadcast services and a non-broadcast advertiser is operatively attached to the outer encasement.

4. A radio apparatus as recited in claim 1, and further wherein the outer encasement defines the promotional identifier of one of broadcast services and a non-broadcast advertiser and further includes a promotional identifier of the other of broadcast services and a non-broadcast advertiser.

5. A radio apparatus as recited in claim 1, and further wherein the radio signal receiver is configured to only receive the broadcast signal of a pre-determined frequency, representing broadcast services of the radio station.

6. A radio apparatus as recited in claim 1, and further wherein the radio signal receiver is configured to receive multiple broadcast signals of different frequencies, and the audio output is configured to only output radio signals received of the pre-determined frequency, representing broadcast services of the radio station.

7. A radio apparatus as recited in claim 6 and further wherein the audio output is set to only output radio signals received of the pre-determined frequency through a mechanical setting of the audio output to the predetermined radio station.

8. A radio apparatus as recited in claim 6 and further wherein the audio output is set to only output radio signals received of the pre-determined frequency through an electronic setting of the audio output to the predetermined radio station.

9. A radio apparatus as recited in claim 1 and wherein the audio output is limited to a predetermined radio signal frequency representing broadcast services of a radio station by positioning a frequency tuner in the outer encasement such that once the tuner is set to a pre-determined radio signal frequency representing broadcast services of a radio station and the outer encasement closed, the tuner is not normally accessible by a user of the radio apparatus.

10. A radio apparatus as recited in claim 1, and further wherein the radio signal receiver is configured to receive at least one of AM and FM radio signals.

11. A radio apparatus comprising:

an outer encasement;

an antenna secured relative to the outer encasement;

a multi-frequency tuner operatively connected to the antenna, the tuner being capable of receiving a plurality of frequencies of radio signals, but is configured to only receive one pre-determined radio signal frequency from the antenna;

a demodulator disposed to receive the radio signal from the antenna;

an amplifier operatively connected to the demodulator to receive the radio signal from the demodulator and to create an amplified radio signal;

an audio output operatively connected to the amplifier to receive the amplified radio signal from the demodulator; and wherein the radio apparatus includes a promotional identifier of one of broadcast services and a non-broadcast advertiser.

12. A radio apparatus as recited in claim 11, and further wherein the audio output device transmits the broadcast services of one radio station.

13. A radio apparatus as recited in claim 11, and further wherein the demodulator is a diode.

14. A radio apparatus as recited in claim 11, and further wherein the radio apparatus is miniature.

15. A radio apparatus as recited in claim 11, and further wherein the outer encasement defines the promotional identifier of one of broadcast services and a non-broadcast advertiser.

16. A radio apparatus as recited in claim 11, and further wherein the promotional identifier of one of broadcast services and non-broadcast advertiser is operatively attached to the outer encasement.

17. A radio apparatus as recited in claim 11, and further wherein the outer encasement defines the promotional identifier of one of broadcast services and a non-broadcast advertiser and further includes a promotional identifier of the other of broadcast services and the non-broadcast advertiser.

18. A radio apparatus as recited in claim 11, and further wherein the tuner is configured to only allow the receipt of one of a pre-determined AM and FM radio signal frequency from the antenna by being enclosed in the outer encasement.

19. A radio apparatus as recited in claim 11, and further wherein the tuner is configured to only receive one of a pre-determined AM and FM radio signal frequency from the antenna with an electronic tuner lock.

20. A radio apparatus as recited in claim 11, and further wherein the tuner is configured to only receive at least one of a pre-determined AM and FM radio signal frequency from the antenna.

21. A method of promoting radio broadcast services, comprising the following:

providing a radio apparatus capable of receiving a plurality of frequencies of radio signals, comprising:

an audio output;

an encasement with at least one promotional element of one of broadcast services and a non-broadcast advertiser thereon;

setting the radio apparatus to provide audio output only for one predetermined radio broadcast frequency related to a source of the radio broadcast services being promoted such that the radio apparatus may not readily be changed to broadcast audio output for any other radio broadcast services; and distributing the radio apparatus to one of existing and prospective listeners of the source of the radio broadcast services being promoted, thereby promoting the radio broadcast services.

22. A method of promoting radio broadcast services as recited in claim 21, and further wherein the radio apparatus is miniature.

23. A method as recited in claim 21, and further wherein the promotional element is an indicia which indicates the source of the broadcast services.

24. A method as recited in claim 21, and wherein the encasement further includes a second promotional element which is an indicia from a non-broadcast advertiser.

25. A method as recited in claim 21, and further wherein the promotional element is an indicia which indicates the source of a non-broadcast advertiser.

26. A method as recited in claim 21, and further wherein the promotional element is defined by the outer encasement.

27. A method as recited in claim 21, and further wherein the broadcast services are those of a non-profit organization.

28. A method as recited in claim 21, and further wherein the broadcast services are related to broadcasting of games of a sports team.

29. A radio apparatus comprising:

an outer encasement;

a radio signal receiver secured relative to the outer encasement and configured to receive at least one radio signal;

an audio output operatively connected to the radio signal receiver; wherein a frequency tuner capable of receiving a plurality of frequencies of radio signals is located inside the outer encasement such that once the tuner is set to a pre-determined radio signal frequency representing broadcast services of a radio station and the outer encasement fixed in a closed position, the tuner is not normally accessible by a user of the radio apparatus; and further wherein the outer encasement defines a promotional identifier of one of broadcast services and a non-broadcast advertiser.

30. A radio apparatus as recited in claim 29, and further wherein a promotional identifier of one of broadcast services and a non-broadcast advertiser is operatively attached to the outer encasement.

31. A radio apparatus as recited in claim 29, and further wherein the outer encasement defines a promotional identifier of one of broadcast services and a non-broadcast advertiser, and further includes a promotional identifier of the other of broadcast services and the non-broadcast advertiser.

32. A method for creating a radio apparatus dedicated to provide an audio output of a single radio station, comprising:

providing an outer encasement;

providing a radio signal receiver secured relative to the outer encasement and configured to receive radio signals;

providing an audio output device operatively connected to the radio signal receiver to receive a signal from the radio signal receiver and convert the signal to an audio output, the audio output device being capable of receiving a plurality of frequencies of radio signals;

wherein the audio output may be limited to a predetermined radio signal frequency representing broadcast services of a single radio station; and wherein the radio apparatus includes a promotional identifier of one of broadcast services and a non-broadcast advertiser.

33. A method for creating a radio apparatus dedicated to provide an audio output of a single radio station as recited in claim 32, and further wherein the promotional identifier of one of broadcast services and a non-broadcast advertiser is operatively attached to the outer encasement.

34. A method for creating a radio apparatus dedicated to provide an audio output of a single radio station as recited in claim 32, and further wherein the outer encasement defines a the promotional identifier of one of broadcast services and a non-broadcast advertiser, and further includes a second promotional identifier.

35. A method for creating a radio apparatus dedicated to provide an audio output of a single radio station as recited in claim 32, and further wherein the radio signals are at least one of AM and FM radio signals.

36. A method of providing a promotional vehicle for promoting radio broadcast services of a radio station, comprising the following:

providing a radio apparatus comprising:

an outer encasement;

a radio signal receiver secured within the outer encasement, the radio signal receiver being capable of receiving a plurality of frequencies of radio signals and configured to receive at least one radio signal;

a radio tuner contained within the outer encasement and operatively attached to the radio signal receiver such that the radio tuner controls which of the plurality of frequencies of radio signals is received;

an audio output device operatively connected to receive signals from the radio signal receiver and to generate a radio output signal;

setting the radio tuner to only receive and provide radio output from radio signals received from a single radio station;

wherein encasing the radio tuner within the outer encasement prevents ready access to the radio tuner; and wherein the radio apparatus includes a promotional identifier of one of broadcast services and a non-broadcast advertiser.

37. A radio apparatus as recited in claim 36, and further wherein the at least one of the radio signals is one of AM and FM radio signals.

* * * * *